United States Patent [19]

Arnaud

[11] Patent Number: 4,566,809
[45] Date of Patent: Jan. 28, 1986

[54] INFRA-RED RADIATION TEMPERATURE MEASUREMENT OF A MOVING WIRE

[75] Inventor: Robert Arnaud, La Celle-Saint-Cloud, France

[73] Assignee: Mecilec, France

[21] Appl. No.: 579,591

[22] Filed: Feb. 13, 1984

Related U.S. Application Data

[63] Continuation-in-part of Ser. No. 323,770, Nov. 20, 1981, abandoned.

[30] Foreign Application Priority Data

Jan. 16, 1981 [FR] France .................................. 81 00831

[51] Int. Cl.[4] ............................. G01J 5/10; G01J 5/62
[52] U.S. Cl. .................................... 374/126; 374/153; 250/353
[58] Field of Search .................. 374/130, 2, 9, 37, 128, 374/164, 126, 153; 250/554

[56] References Cited

U.S. PATENT DOCUMENTS

| | | | |
|---|---|---|---|
| 2,846,882 | 8/1958 | Gray | 374/126 |
| 3,358,974 | 12/1967 | Bernard | 374/123 X |
| 3,430,492 | 3/1969 | Matsumoto et al. | 374/153 X |
| 3,539,807 | 11/1970 | Bickel | 374/9 X |
| 3,559,726 | 2/1971 | Menasoff | 374/126 X |
| 3,653,263 | 4/1972 | Poole et al. | 374/153 X |
| 4,172,383 | 10/1979 | Iuchi | 374/126 X |
| 4,316,088 | 2/1982 | Corbier et al. | 374/153 |
| 4,417,822 | 11/1983 | Stein et al. | 374/126 X |
| 4,465,382 | 8/1984 | Iuchi et al. | 374/9 |

Primary Examiner—Daniel M. Yasich
Attorney, Agent, or Firm—Steinberg & Raskin

[57] ABSTRACT

A device and process for measuring infra-red radiation for determining the temperature of wires in lengthwise movement in front of a black background of a heated enclosure constituting a black body and emitting infra-red radiation, and comprising two infra-red-transparent convergent lenses for effecting two optical paths through two spaced windows of the enclosure, respectively; a plane mirror for directing the infra-red radiation resulting from each of said optical paths on an infra-red detector; a rotatable notched disc placed close by said lenses so that the obturation and opening of the lenses by the rotating disc produces a "diaphram effect".

4 Claims, 15 Drawing Figures

INFRA-RED RADIATION TEMPERATURE MEASUREMENT OF A MOVING WIRE

BACKGROUND OF THE INVENTION

This is a continuation-in-part of application Ser. No. 323,770 filed on Nov. 20th, 1981, now abandoned, in the name of MECILEC for a device and process for measuring infra-red radiation for determining the temperature of wires and bars in movement.

The present invention relates to a device and process for measuring the temperature of cylindrical bodies of infinite length in lengthwise movement, the said measurement being effected independently of the emissive power of the body, by detecting the infra-red radiation.

The measurement and control of the temperature of cylindrical bodies in lengthwise movement, e.g. of wires or the like and bars, is an industrial problem which arises more and more frequently. For example, in the cable manufacturing plants, the knowledge of the temperature of the wire before its coating with a plastic material allows improving the coating process. For example, in wire-drawing works, the knowledge of the temperature of the wire after its passage through a die allows avoiding accidents by modifying the drawing speed.

This invention is based on a well-known principle of thermotechnics, described particularly by Professor DESVIGNE in his course of lectures on heat radiation delivered at the Institute of Optics:

When an object whose emission coefficient is A is located within an enclosure constituting a blackbody and if $L'_n$ is the luminance of the blackbody at the temperature of the wire and $L_n$ is the luminance of this same blackbody at another temperature, the luminance of the object is:

$$L_f = A L'_n + (1-A)L_n$$

If a same infra-red radiation detector is used to measure the luminance of the object $L_f$ and the luminance of the blackbody $L_n$ at another temperature and if the difference of the signals obtained corresponds to the luminance of the signal L:

$$L = L_f - L_n = A L'_n - L_n = A\ l'_n = (1-A)L_n - L_n = A(L'_n - L_n)$$

If the temperature of the object is that of the blackbody, $L'_n$ equals $L_n$, and the difference between the signals is zero.

Relying on this known principle, a cylindrical body is caused to pass in lengthwise movement through a heated enclosure constituting a blackbody.

French patent No. 2 109 406 filed on Oct. 15th, 1970, by LABORATOIRE D'ELECTRONIQUE ET DE PHYSIQUE APPLIQUEE (LEP) and the issuance of which was published on May 26th, 1972, relates to a process and a device for measuring the temperature of a wire in lengthwise movement, the said wire passing in front of a black background brought to a uniform temperature and a lens together with an oscillating mirror being used to focus on an infra-red sensitive detector the parallel rays issuing from the wire and the black background, at the focus of the optical system.

This arrangement offers the advantage of ensuring the temperature measurement independently of the position of the wire in the dark field, but, on the other hand, suffers on the disadvantage of a very low optical efficiency because of the small proportion of infra-red rays which are substantially parallel to the optical axis and which are then focused on the sensitive element.

French patent No. 2,447,543 filed on Jan. 23rd, 1979, by the company EUROTHERM employs the same means, although in an improved form, as the prior LEP patent, but the optical converging device (a spherical mirror plus a plane mirror) is used to converge, as in a conventional pyrometer, the radiation issuing from the wire and the black background, in a solid angle determined by the position of the wire and the optical aperture, instead of using only the parallel radiation.

This arrangement, in current use in pyrometry, offers the advantage of considerably increasing the efficiency of the optical system, but, on the other hand, the displacements and vibrations of the wire result in an instability in frequency and level of the output signal of the detector, in the sense that it is the image of the wire upon the detector that produces the output signal, and if the wire is in a perpendicular direction to its displacement, the intervening time factor results in changing the frequency or the level of the signal since the synchronous detection remains unchanged in the course of time.

SUMMARY OF THE INVENTION

The present invention offers the advantage of remedying this drawback, by no longer using the wire as the origin of the signal with a synchronous detection, but any image containing the wire, whatever its position, by employing two optical paths, one from the wire and the other from the black background, and by passing from one optical path to the other by means of a diaphragm effect, in the same manner as a continual lap dissolve or cross fade.

BRIEF DESCRIPTION OF THE DRAWINGS

The invention will be better understood by means of the following description of one form of embodiment given by way of non-limitative example with the appended drawings wherein.

DESCRIPTION OF PREFERRED EMBODIMENTS

Figure 1:
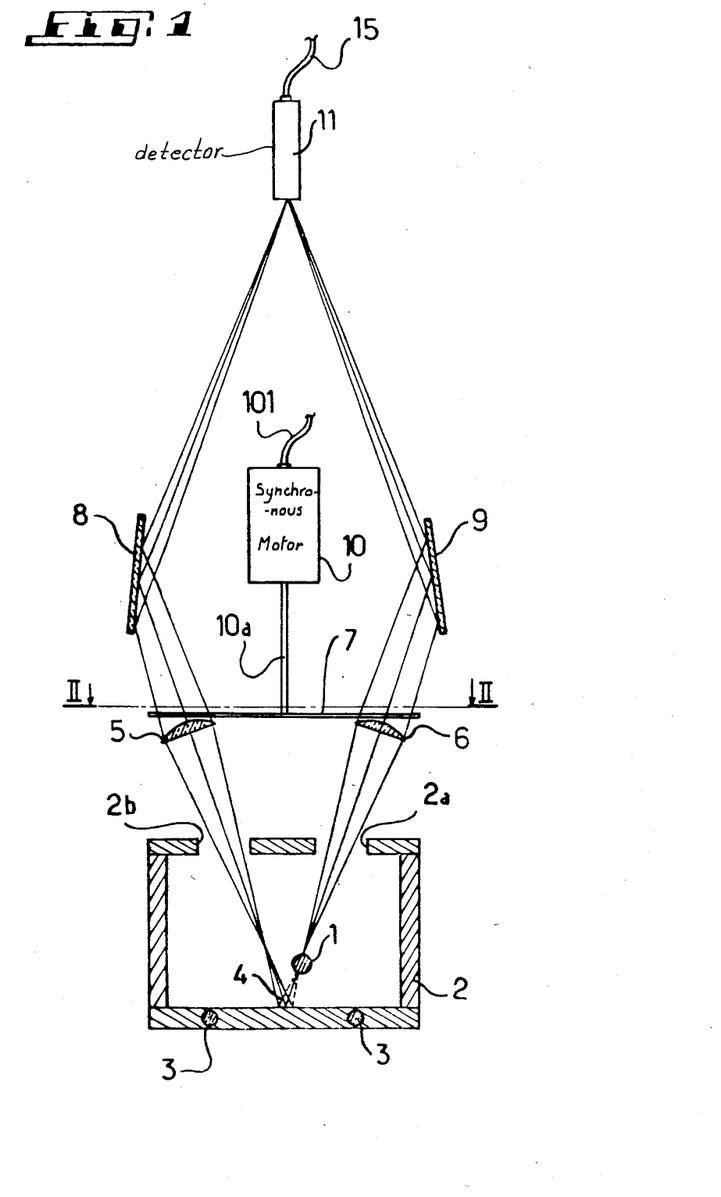
FIG. 1 is a schematic diagram of the measuring device according to the invention, with the exception of the electronic portion.

Reference is now made to FIG. 1.

There is shown at 1 the wire or the like the temperature of which is to be determined. It moves in the direction of its length within an enclosure 2 constituting a blackbody and, as such, is made of a material whose surface condition imparts to it a high emissive power.

To render the temperature of the enclosure uniform, the latter is surrounded with an insulating casing or the like, (not shown) made from glass fibre, the enclosure being constituted by a metallic material of high thermal conductivity, e.g. cupro-chromium-zirconium bronze, which also offers the advantage of good mechanical resistance. The internal surface of the enclosure is coated with graphite.

This enclosure constituting a blackbody is heated by resistors 3 and has two spaced windows 2a and 2b. Thus, the wire is in lengthwise movement in front of a black background of the heated enclosure.

In the absence of a wire, the radiation emitted by the same small zone 4 of black background, through the two spaced windows 2a and 2b, is concentrated along two distinct paths by the lenses 5 and 6 and the plane mirrors 8 and 9 on the same sensitive surface of the infra-red detector 11.

The wire partially or completely interrupts one of those paths. The advantage of aiming at one and the same small zone instead of two different zones, one for each path, as in the addition to the French patent No. 69370, is that one is sure that the temperature is the same, whereas the temperatures are different if the regions or zones aimed at are distinct.

Indeed, the measurements of the temperature of the wire with the known devices are considerably influenced by the differences in the temperatures of the black background of the blackbody which has always some imperfections due to its non-homogeneous internal structure. This is eliminated with the optical aiming according to the invention.

One and the other optical paths is successively and periodically interrupted by a notched disc 7 driven in rotation by a small synchronous motor 10 connected to an external supply source (not shown) via leads 101.

Figure 2:
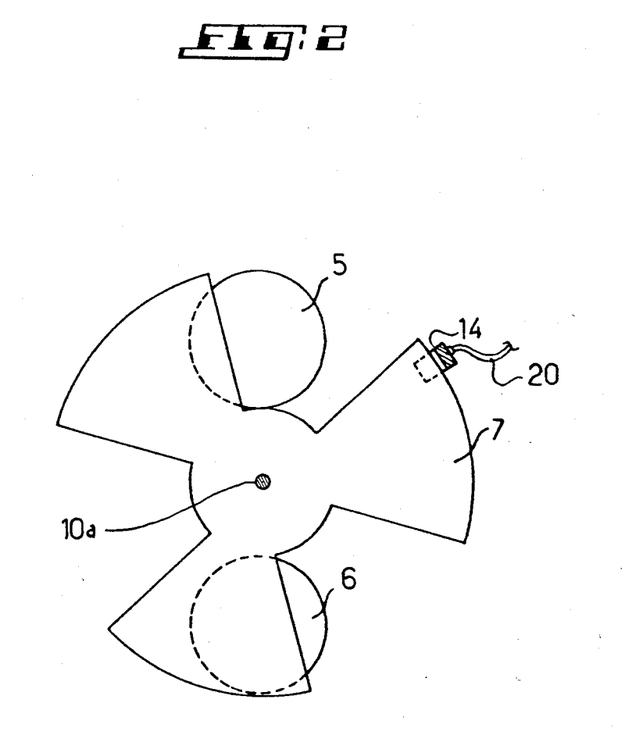
FIG. 2 is the shutter or obturating disc which plays an important role.

As shown in FIGS. 1 and 2, the notched disc is placed as close as possible to, or in the immediate proximity of, the lenses 5 and 6, so that the obturation of the lenses produces an effect called a "diaphragm effect". If 12 and 13 illustrate the respective apertures of the lenses 5 and 6, the dimensions of the notches of the disc 7 are such that the surface obstructed on one aperture is equal to that opened on the other aperture, as shown in FIG. 2, which leads to a complementarity of the obstructed and open surfaces of the lenses. It can also be said that the sum of the obstructed surface and the open surface remains constant.

This arrangement allows the image arriving through the first path, which replaces the one arriving through the second path, to appear with the same progressivity on the sensitive element and to disappear with the same progressivity as a cross fade.

The advantage of such a diaphragm effect is to benefit from the full aperture of the lenses so as to focus on the sensitive element of the detector all of the infra-red radiation coming from the wire plus the black background of the blackbody.

Figure 15:
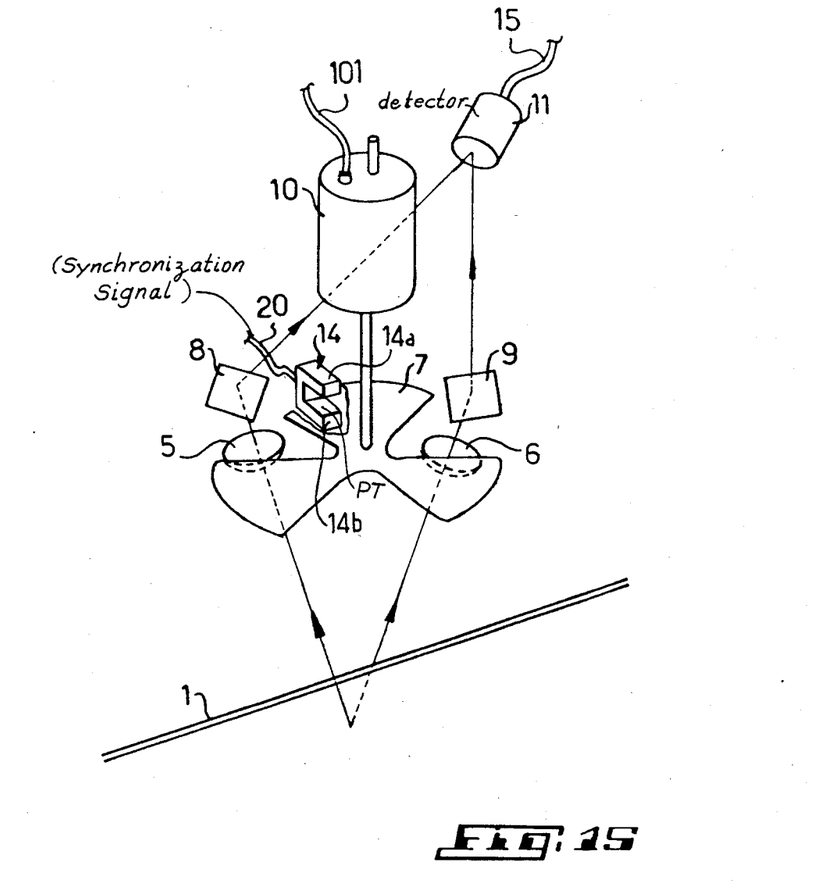
FIG. 15 shows the mechanical portion of the device of the invention.

There is diagrammatically shown in FIG. 15 the mechanical device for driving the notched disc and a device 14 including two spaced parallel legs 14a, 14b between which passes the disc 7, device 14 producing a synchronism signal. The motor 10 drives directly the disc 7, via shaft 10a. In leg 14b is mounted a phototransistor pt or the like which receives a radiation emitted from an emitting element (not shown) within leg 14a. This emitting element may be a lamp emitting a light beam towards the phototransistor. The phototransistor detects the position of the disc 7 and more particularly determines the useful half-wave of FIG. 3 or 5, the said phototransistor delivering a synchronizing pulse on the passing of the disc, i.e., when the light beam is interrupted.

The detection of the radiation from the wire 1 takes place through the path comprising the optical lens 6 and the mirror 9 and leading to the infra-red radiation detector 11. The other path comprises the optical lens 5 and the mirror 8 and leads to the same detector 11.

Figure 3:
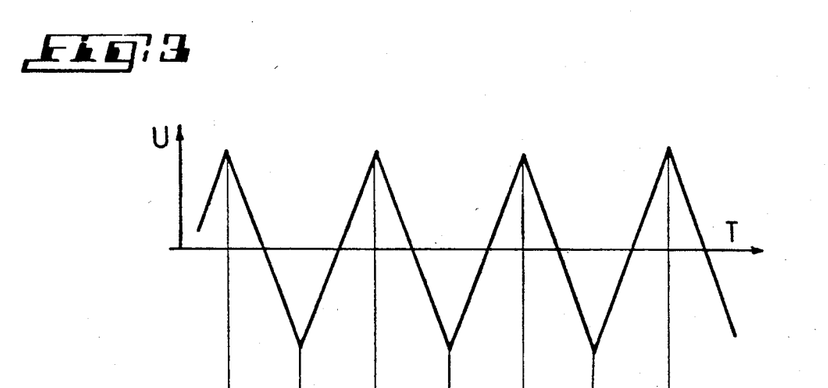
FIGS. 3, 4 and 5 illustrate the variations of the electric signals issuing from the infra-red radiation detector as a function of time.
Figure 4:
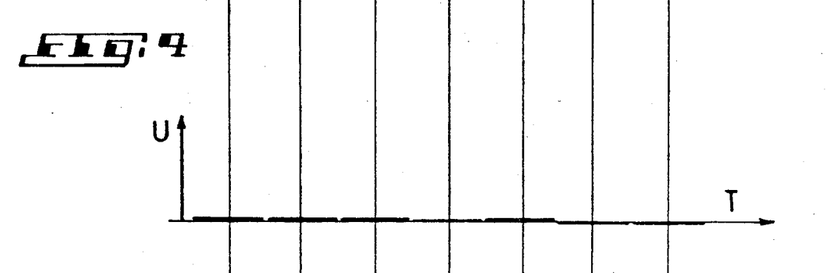
Figure 5:
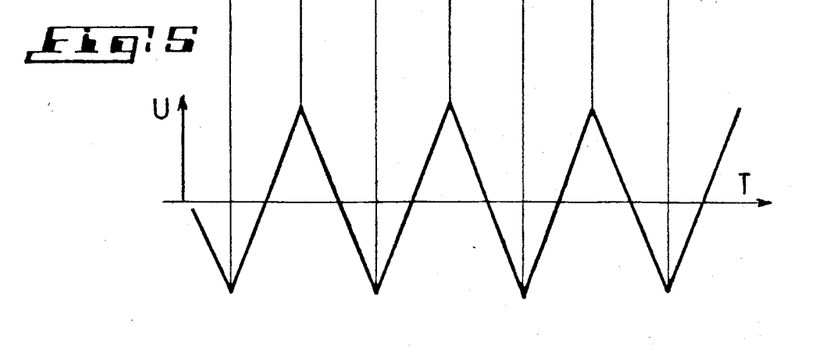

Reference is now made to FIGS. 3, 4 and 5.

In the absence of a wire, or if the wire is at the same temperature as the zone of the black background encompassing it, the radiation following the first path is equal to the radiation following the second path. The output signal is then flat as indicated in FIG. 4. FIG. 3 illustrates the case of a wire which is hotter than the black background: the radiation following the first path becomes progressively more important to reach a maximum, and then the radiation following the second path progressively replaces the radiation of the first path until a minimum value is reached.

FIG. 5 illustrates the case of a wire which is less hot than the zone of the black background encompassing it. The radiation following the first path and progressively replacing that of the second path reaches a minimum value and then is progressively replaced by the radiation of the second path issuing from the black background and which is more important until a maximum value is reached.

Figure 6:
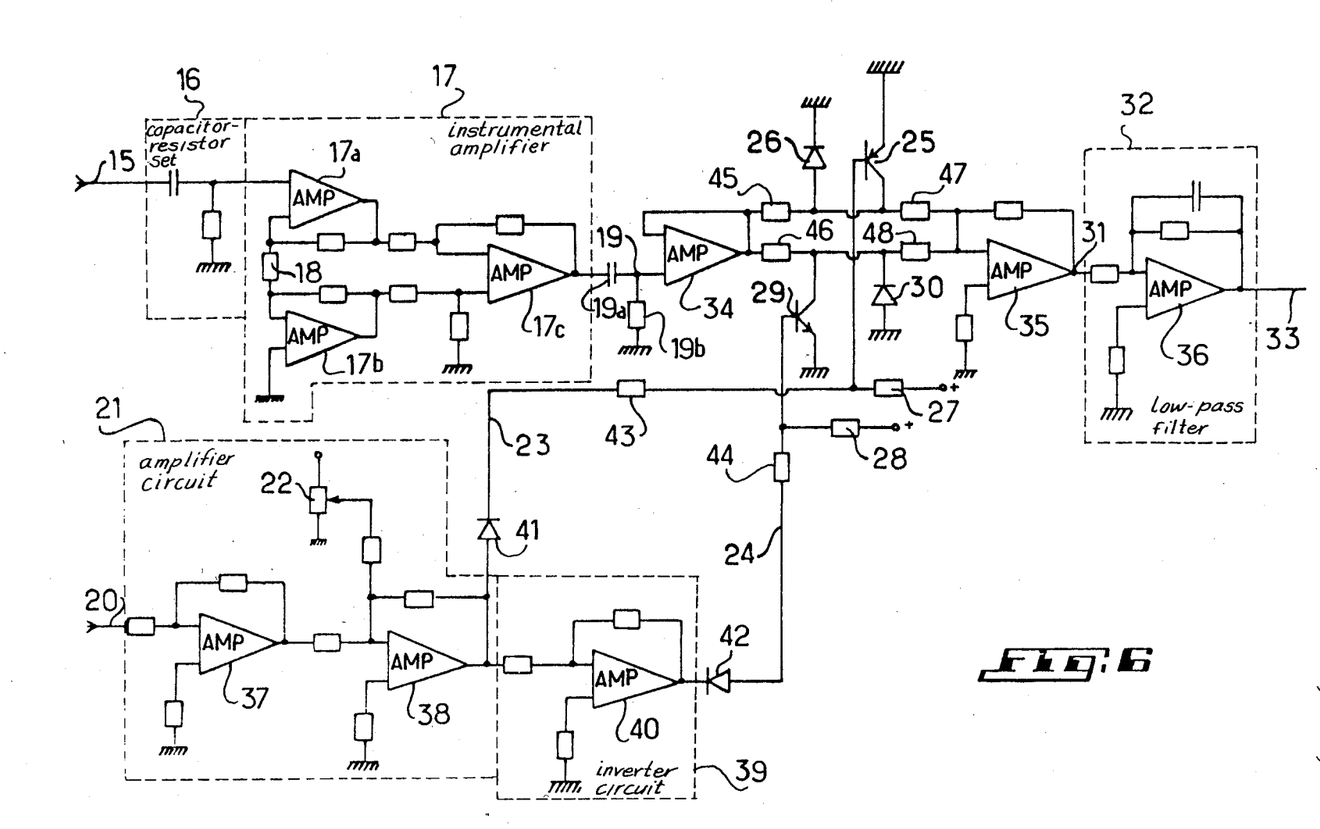
FIG. 6 shows the electronic circuit diagram of the device according to the invention.

The graphs of FIGS. 3 to 5 illustrate the variation in time of the output voltages of the detector 11 after the capacitor-resistor set 16 shown in FIG. 6, whose purpose is to render the curve symmetrical with respect to the earth. As shown, these output voltages are triangle-waves voltages.

It will be noted that the disc 7 placed in front of the optical lenses 5 and 6 has by itself practically no effect on the detector, for it is located outside the conditions of convergence of the radiation emitted, on the one hand, from the blackbody portion 4 and, on the other hand, from the wire 1.

It is observed that the curves in FIGS. 3 and 5 are in phase opposition and that a half-wave, namely, that corresponding to the radiation from the wire, is representative of the temperature of the latter with respect to the temperature of the black body, since it relates to the whole radiation from the wire whose image appears on the disappears from the detector, and not on a portion of the image.

This remark leads to an important simplification of the electronic circuit and allows particularly dispensing with the synchronous detection circuits, as in the two aforementioned French patents and namely in French patent No. 69370. Indeed, the electronic circuit disclosed in this French patent must use a complicated synchronous detection circuit delivering pulses applied to the bases of two transistors of blocking circuits, said pulses discharging two capacitors which had previously stocked peak values of the output signal of the infra-red detector when the plane mirror has focused the infra-red radiation coming from the wire on the sensitive element of the detector. The purpose of the electronic circuit of the invention is to eliminate one half-wave out of two, to determine the appropriate half-wave corresponding to the wire from synchronizing signal issued from device 14, to measure it, to determine its polarity, since it is positive if the wire is hotter than the blackbody and negative if the wire is colder.

Reference is now made to FIG. 6, illustrating the electronic circuit of the apparatus of the present invention.

The half-waves AC voltage outputs from infra-red detector 11 is applied through lead 15 to the input of capacitor-resistor set 16 which cancels any DC component. The half-waves from capacitor-resistor set 16 are amplified in the circuit 17 which is an instrumental amplifier having a very high impedance input and formed by operational amplifiers 17a, 17b and 17c. The amplification ratio of instrumental amplifier is determined by the value of the resistance 18. At the output 19 of capacitor 19a- resistor 19b assembly is delivered an amplified AC voltage symmetrical with respect to the earth, illustrated in FIGS. 3, 4 and 5. The output 19 is connected to the input of operational amplifier 34.

Figures 7, 8:
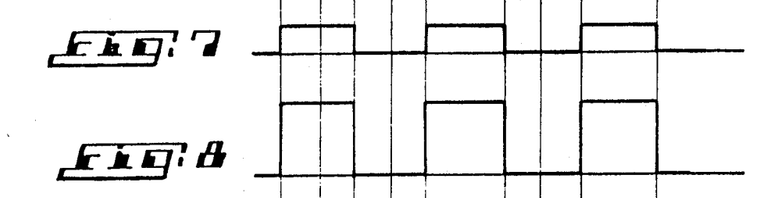
FIGS. 7, 8, 9, 10 and 11 illustrate the electric signals produced in the electronic circuit of FIG. 6.

On the other hand, synchronizing impulses coming from phototransistor pt of device 14 are applied to the input of an amplifier circuit 21 through lead 20, those impulses being represented in FIG. 7. The circuit 21 includes operational amplifiers 37 and 38 connected in cascade. Referenced by 22 in circuit 21 is a potentiometer for cancelling the offset after the amplification.

The amplified impulses from circuit 21 are applied, on the one hand, to an inverter circuit 39 (whose output is connected to the cathode of diode 42) including operational amplifier 40 and, on the other hand, to the anode of diode 41. The cathode of diode 41 and the anode of diode 42 are connected to leads 23 and 24, respectively, and on which are present positive or negative impulses illustrated in FIGS. 8 and 9. The leads 23 and 24 are connected to the bases of two transistors 25 and 29, respectively, via resistances 43 and 44.

The amplified AC voltages proceeding from the detector and issuing at the output of operational amplifier 34, passes through two branches, one cancelling the positive half-wave by means of the diode 26, whose anode is connected to output of operational amplifier 34 via resistance 45, and the other cancelling the negative half-wave by means of the diode 30, whose cathode is connected to the output of operational amplifier 34 via resistance 46. The cathode and anode of diodes 26 and 30 are connected to the earth. The anode and cathode of diodes 26 and 30 are also connected to resistances 47 and 48, respectively, and to collectors of transistors 25 and 29. Resistances 47 and 48 are connected together to input of operational amplifier 35. Thus, the signals appearing on the two branches are added to operational amplifier 35.

The bases of transistors 25 and 29 are connected to the ends of resistances 27 and 28, respectively, whose other ends are connected to a supplying source (not shown).

Figure 9:
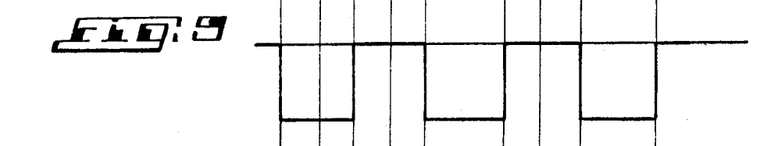
Figure 10:
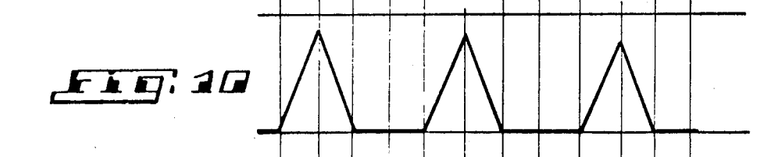
Figure 11:
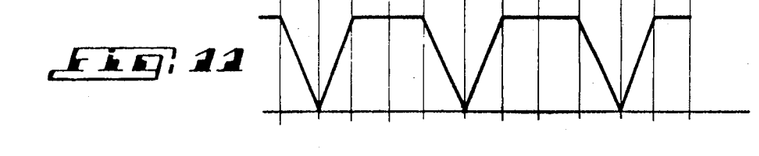
Figure 12:
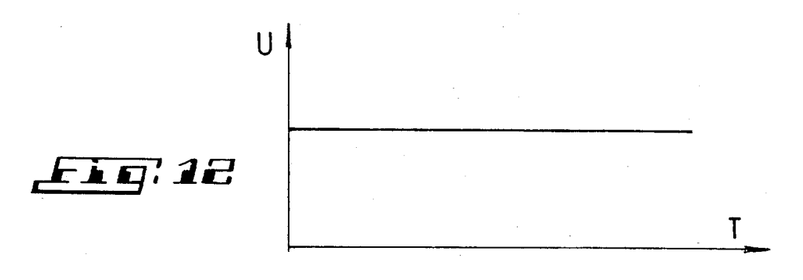
FIGS. 12, 13 and 14 illustrate the output DC voltages of the electronic circuit which are representative of the temperature of the cylindrical body.
Figure 13:
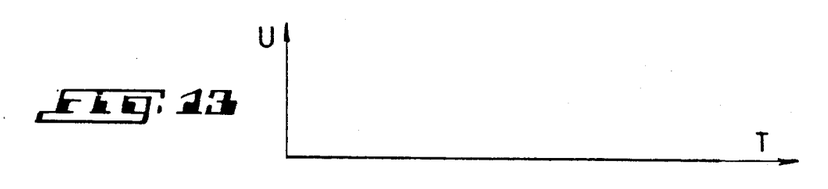
Figure 14:
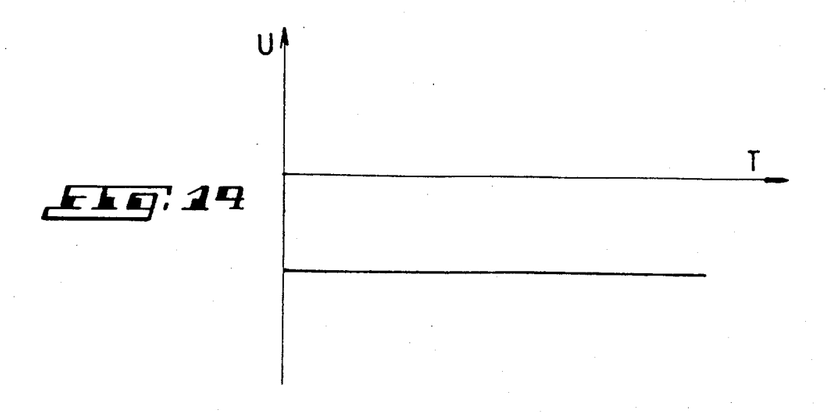

The transistors 25 and 29 which are normally conductive owing to the currents flowing through the resistors 27 and 28 are blocked and non-conductive when the voltages illustrated in FIGS. 8 and 9 are applied to their base. At output 31 of amplifier 35 there issue voltages whose shapes are illustrated in FIGS. 10 or 11 or 4 and which are representative of the temperature of the wire. Those voltages pass through the low-pass filter 32 including operational amplifier 36 from which there issues, at output 33, a positive, negative or zero DC voltage illustrated in FIGS. 12, 13 and 14.

The apparatus of the present invention has given excellent results in the measurement of the temperature of cylindrical bodies, more particularly by using as a detector a quick-acting selenium detector.

What is claimed is:

1. A process of measuring by infra-red thermometry means the temperature of a body, such as a wire, bar or the like, in lengthwise movement in a black background of a heated insulated high thermal conductive enclosure constituting a black body and emitting infra-red radiation, said process comprising the steps of: effecting a pair of optical emissive radiation paths through two spaced windows of the enclosure, one of said optical paths located in a portion of said body with said wire interrupting a first one of said paths and a zone of said black background encompassing said portion of the body, and another second path of said optical paths located in a zone of said black background equivalent to said zone encompassing said body; directing by a first and second reflective mirror means onto the sensitive surface of an infra-red detector the infra-red emissive radiation coming from said body and the zone of said black background encompassing it, and the infra-red emissive radiation coming from said equivalent zone of said black background only when there is no wire present in the black background body; successively interrupting with a notched disc said two infra-red radiations; processing with an electronic circuit the output signal of said infra-red detector representative of the temperature of said body with respect to the temperature of said zone of the black background, said electronic circuit delivering a positive, negative or zero output signal depending on whether said body is hotter or colder than, or at the same temperature as, said zone of black background; wherein said process further comprises the steps of effecting each of said optical paths that first pass through said, windows to then pass through two infra-red transparent convergent lenses; directing the infra-red radiation resulting from each of said optical paths on said infra-red detector with a separate plane mirror; placing said notched disc close by said lenses; rotating said notched disc so that the notches cause the image transmitted from a first path of said optical paths to progressively appear on said infra-red detector while causing the image transmitted from the second path to progressively disappear in a synchronized manner until the instant where there appears on said detector only the image from the first path which immediately disappears progressively, whereas there appears progressively on said infra-red detector the image from the second path, until the instant when there appears on said infra-red detector only the image of the second path, said disc notches being arranged so that an obstructed surface of one of said lenses being equal to an open surface of the other lens, and wherein, in the absence of said body, said process further comprises the step of leading said two optical paths to a same region of said black background.

2. A process according to claim 1, further comprising the steps of: collecting a triangular shaped-wave AC signal at said infra-red detector output due to the complementarity of the obstructed and open surfaces of said lenses; emitting to said electronic circuit a pulse for determining half-wave of said paths representative of the radiation temperature coming from said body with respect to the temperature of said black background; processing each half-wave with said electronic circuit and delivering to the output of said electronic circuit said positive, negative or zero output signal depending on whether said body is hotter or colder than, or at the same temperature as, said black background.

3. A device for measuring by infra-red thermometry means the temperature of a body, such as a wire, bar or the like, in lengthwise movement in a black background of a heated enclosure constituting a black body and emitting infra-red radiation, said device comprising means for effecting a pair of emissive radiation optical paths through two spaced windows of the enclosure, one of said optical paths located in a portion of said body and a zone of said black background encompassing said portion of the body, and another second path of said optical paths located in a zone of said black background equivalent to said zone encompassing said body; means for directing onto the sensitive surface of an infra-red detector the infra-red radiation coming from said body and the zone of said black background encompassing it through one of said spaced windows, and the infra-red radiation coming from said equivalent zone of said black background only through the other of said spaced windows; a notched disc positioned adjacent to said means for effecting said pair of optical paths and arranged for successively interrupting said two infra-red radiations; an electronic circuit for processing the output signal of said infra-red detector representative of the temperature of said body with respect to the temperature of said zone of the black background, said electronic circuit delivering a positive, negative or zero output signal depending on whether said body is hotter or colder than, or at the same temperature as, said zone of black background; wherein said means for effecting each of said optical paths directed towards said infra-red detector are two infra-red transparent convergent lenses; said means for directing the infra-red radiation resulting from each of said optical paths on said infra-red detector is a separate plane mirror; said notched disc being placed close by said lenses and being rotated so that the notches cause the image transmitted from a first path of said optical paths to progressively appear on said infra-red detector while causing the image transmitted from the second path to progressively disappear in a synchronized manner, until the instant when there appears on said detector only the image from the first path which immediately disappears progressively, whereas there appears progressively on said infra-red detector the image from the second path, until the instant when there appears on said infra-red detector only the image of the second path, said disc notches being arranged so that an obstructed surface of one of said lenses being equal to an open surface of the other lens, and wherein, in the absence of said body, said two lenses and their associated plane mirror leading said two optical paths to the same region of said black background.

4. A device according to claim 3, further comprising means for collecting a triangular shaped-wave AC signal at said infra-red detector output due to the complementarity of the obstructed and open surfaces of said lenses; means for emitting to said electronic circuit a pulse for determining half-wave of said half path representative of the radiation temperature coming from said body with respect to the temperature of said black background; means in said electronic circuit for processing each half-wave and means for delivering to the output of said electronic circuit said positive, negative or zero output signal depending on whether said body is hotter or colder than, or at the same temperature as, said black background.

* * * * *